Dec. 16, 1947.  W. M. McCASKELL  2,432,918
FLOAT TYPE WATER HEATER
Filed Aug. 14, 1945
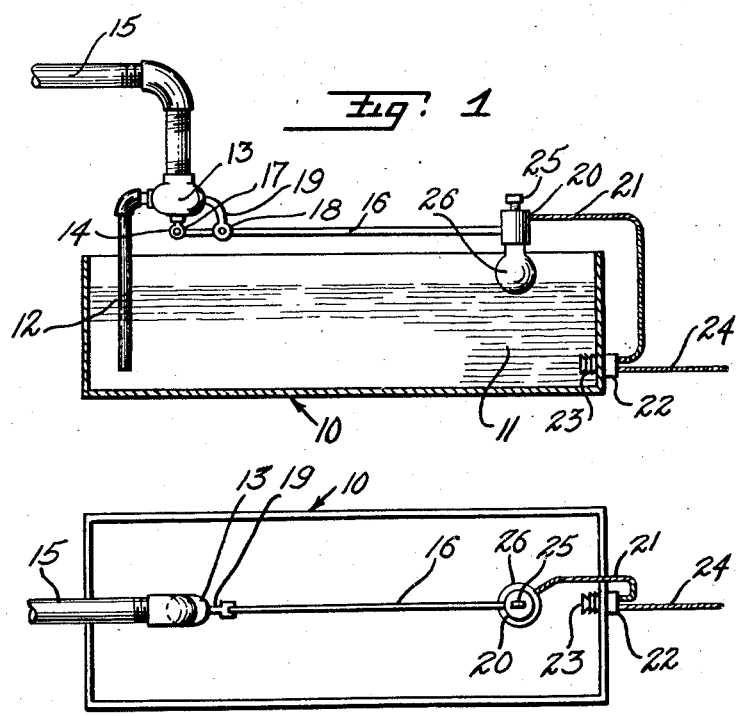
Inventor
William M. McCaskell
By Clarence A. O'Brien
and Harvey B. Jacobson
Attorneys Patented Dec. 16, 1947

2,432,918

UNITED STATES PATENT OFFICE 2,432,918

FLOAT TYPE WATER HEATER

William M. McCaskell, Los Angeles, Calif.

Application August 14, 1945, Serial No. 610,808

9 Claims. (Cl. 219—38)

This invention relates to a float-type water heater, and more particularly to such a water heater adapted to be utilized in conjunction with a water tank, such as a tank providing drinking water for livestock, or the like, normally exposed to the weather.

A primary object of this invention is to heat water in a tank normally exposed to the elements, the quantity of water in which is controlled by a float valve. An additional object of the invention is to simplify the construction of such a float and heater assembly utilized with such a tank.

An important feature of the invention is the provision of a float for such a float valve which comprises a heating element in itself.

A further important feature of the invention is the use of an electric light bulb as a float for a float valve, the light bulb being connected for illumination when the temperature of the water drops below a certain predetermined point, and controlled by a thermostat immersed in the water in the tank.

Other objects will in part be obvious and in part be pointed out as the description of the invention proceeds and shown in the accompanying drawings, wherein there is disclosed a preferred embodiment of this inventive concept.

In the drawings:

Figure 1 is a side view, partially in elevation and partially in section, disclosing one form of the instant inventive concept, and Figure 2 is a top plan view of the device shown in Figure 1.

Similar reference characters refer to similar parts throughout the several views of the drawings.

There is generally indicated at 10 a tank of any desired configuration adapted to contain drinking water 11 for livestock, such as cows, chickens, or other animals, adapted to be filled as by means of an inlet pipe 12 which extends from a valve 13 of any desired conventional design operable by a valve stem 14. Water is admitted to the valve 13 from an inlet pipe 15 which extends from any desired source of water. The movement of the valve stem 14 is controlled by a lever 16 pivotally secured thereto as by a pivot 17, and further pivotally secured as by a pivot 18 to an arm 19 extending from the valve housing. The arm 16 is adapted to be operated by a float, and the arrangement heretofore described has been largely conventional.

In the instant invention, however, the lever 16 terminates in a socket 20 to which extends a suitable wire providing a source of electric current 21, the wire in turn extending to a thermostatic element 22 of any desired conventional type, the temperature responsive portion 23 of which is immersed in the fluid 11 of the tank 10. From the thermostatic element 22 a wire 24 leads to any desired source of power, in such manner that the current supplied to the socket 20 must pass through the thermostatic element 22, which is so designed and arranged as to open or close the circuit in accordance with the temperature of the water in a known manner. The socket 20 is provided with a hand switch 25 of any desired conventional type. A light bulb 26 of any desired wattage and any convenient voltage is adapted to be inserted in the circuit 20 and rest on the surface of the fluid 11 in the tank 10, thus serving as a float which, through the lever 16, operates the float control valve 13.

From the foregoing, it will now be seen that the bulb effectively serves as a float for the float valve, which in turn controls the level of the water in the tank 10, and that correspondingly the bulb 26, when illuminated, serves as a heating element to raise the temperature of the water in the tank, and prevent the same from freezing. The thermostatic control element 22 automatically supplies current to the bulb 26 when the temperature in the tank falls below a predetermined point, and when the temperature has been sufficiently raised, automatically cuts the current therefrom. The manual switch may be utilized to turn off the bulb, as, for example, during warm weather when the operation thereof is not necessary.

From the foregoing, it will now be seen that there is herein provided an improved apparatus for heating and maintaining the water level in a tank, which accomplishes all the objects of this invention, including marked simplicity and inexpensiveness of construction, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. A receptacle having a liquid supply means, a valve controlling said supply means, and a combined liquid heater and float operatively connected with said valve for controlling the level of liquid in said receptacle.

2. A receptacle having a liquid supply means, a valve controlling said supply means, and a combined liquid heater and float operatively connected with said valve for controlling the level of liquid in said receptacle, said float having an electric heater supported thereby.

3. A receptacle having a liquid supply means, a valve controlling said supply means, and a combined liquid heater and float operatively connected with said valve for controlling the level of liquid in said receptacle, said float having an electric heater supported thereby and a thermostat immersed in the liquid in said receptacle for controlling the actuation of said heater.

4. A receptacle having a liquid supply means, a valve controlling said supply means, and a combined liquid heater and float operatively connected with said valve and controlling the level of liquid in said receptacle, said float consisting of an electric light bulb and means for supplying current to said bulb.

5. A receptacle having a liquid supply means, a valve controlling said supply means, and a combined liquid heater and float operatively connected with said valve for controlling the level of liquid in said receptacle, said float consisting of an electric light bulb and means for supplying current to said bulb, and a thermostat immersed in the liquid in said receptacle and controlling the actuation of said heater.

6. A watering fountain for stock and the like comprising a receptacle, a liquid supply means therefor, a control valve in said liquid supply means, and a float connected to said valve for maintaining a predetermined liquid level in said receptacle, said float constituting a heater and electrical means for heating said float.

7. A watering fountain for stock and the like comprising a receptacle, a liquid supply means therefor, a control valve in said liquid supply means, and a float connected to said valve for maintaining a predetermined liquid level in said receptacle, said float constituting a heater and electrical means for heating said float and a thermostat immersed in the liquid in said receptacle and controlling the actuation of said heater.

8. In a receptacle having a liquid supply means and a float controlled valve therefor, a combined float and heater comprising an electric light bulb, an electric circuit connected therewith and actuating means connecting said light bulb and said valve.

9. In a receptacle having a liquid supply means and a float controlled valve therefor, a combined float and heater comprising an electric light bulb, an electric circuit connected therewith and actuating means connecting said light bulb and said valve, and means for controlling said electric circuit in response to predetermined variations in temperature of the liquid in said receptacle.

WILLIAM M. McCASKELL.

REFERENCES CITED

The following references are of record in the file of this patent:

UNITED STATES PATENTS

| Number | Name | Date |
|---|---|---|
| 964,442 | Madary | July 12, 1910 |
| 1,154,113 | Hadaway | Sept. 21, 1915 |
| 1,361,028 | Drake | Dec. 7, 1920 |
| 1,430,548 | Hogue | Oct. 3, 1922 |
| 1,871,277 | Perkett | Aug. 9, 1932 |
| 2,201,901 | Keen | May 21, 1940 |
| 2,336,011 | Haberstump | Dec. 7, 1943 |